April 7, 1959          P. H. PONS          2,880,822

CLAMP-TYPE TRACK BRAKE FOR RAILWAY VEHICLES

Filed May 2, 1955          2 Sheets-Sheet 1

Inventor:
Paul Henri Pons
by Ernest G. Montague
Attorney

United States Patent Office 2,880,822
Patented Apr. 7, 1959

2,880,822
CLAMP-TYPE TRACK BRAKE FOR RAILWAY VEHICLES

Paul Henri Pons, Chantilly, France, assignor to Etablissements Saxby, Paris, France, a corporation of France Application May 2, 1955, Serial No. 505,482

2 Claims. (Cl. 188—62)

The present invention relates to a clamp-type track brake for railway vehicles, of the kind comprising two clamps situated on either side of a rail, the clamp outside the track being movable and being fitted to one end of a lever tilting around an axis parallel with the rail, the other end of the said lever bearing when in the operative position the weight of the wheel rolling along the rail not located between the brake clamps.

In U.S. Patent No. 2,724,459, which was co-pending, a clamp-type track brake for railway vehicles is disclosed wherein the clamp outside the track is movable, while the clamp inside the track is immovably mounted on a carrier. It was thus necessary to move the clamp outside the track towards the clamp inside the track.

It is one object of the present invention to provide a track brake in which the two clamps are vertically movable towards each other, thereby, increasing the braking effect.

It is another object of the present invention to provide a track brake in which the clamp between the two rails is borne by a beam bearing at one end upon a stationary bearer near the rail not located between the clamps, the said tilting lever being pivoted on the said beam.

It is still another object of the present invention to provide a track brake in which the clamp between the rails is borne by a beam bearing at one end upon a stationary bearer and the other end of the beam bears upon a vertically movable bearer.

It is yet another object of the present invention to provide a track brake in which the tilting lever bearing the moving clamp is pivoted on the said beam by a shaft simultaneously acting as the tilting axis.

It is also another object of the present invention to provide a track brake in which the movable bearer is formed by at least one lever, against one end of which the beam bears and the other end of which comprises a roller permitting the said movable bearer to move along a rolling path, the lever pivoting around the point at which the beam bears upon the lever.

It is a still further object of the present invention to provide a track brake in which the rolling path is parallel with the rails.

It is yet another object of the present invention to provide a track brake in which pivoting of the lever is controlled, through rodding, by a device serving to put the brake into the operative position.

With these and other objects in view which will become apparent in the following detailed description, the present invention will be clearly understood in connection with the accompanying drawings, in which.

In all the figures, the same references denote identical or equivalent elements.

Figure 1:
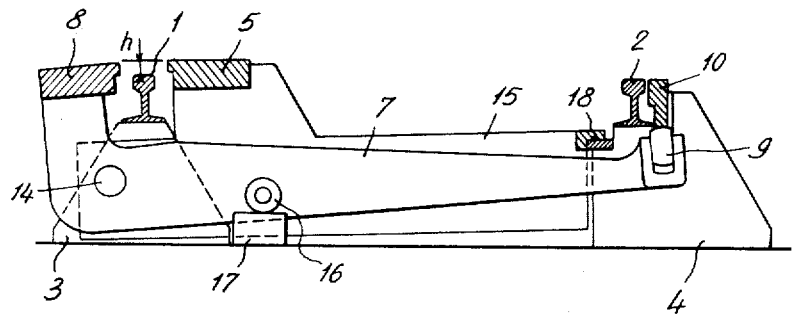
Figure 1 is a cross-sectional view of the track having a brake according to the present invention, the brake being in the unclamped or inoperative position.
Figure 2:
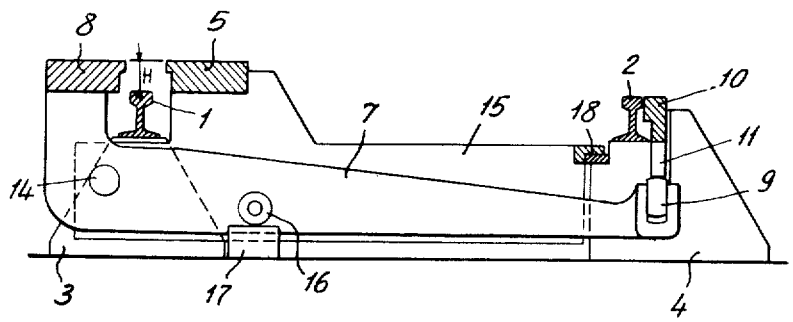
Fig. 2 is a sectional view similar to the view of Fig. 1 but with the brake in the clamping position.
Figure 3:
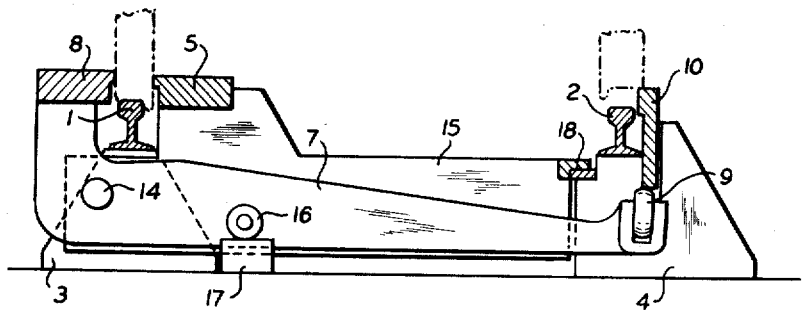
Fig. 3 is a sectional view of the track having a brake according to the present invention, the brake being in the preclamped or ready position.

Referring now to the drawings and in particular to Figs. 1 to 3, the track rails are mounted on carriers 3 and 4. A jaw 5 is disposed between the rails 1 and 2 and located on the inside of one track rail. A spindle 14 is provided, furthermore, on a movable beam 15 to pivotally carry the two-armed lever 7, that is adapted to rock in a plane perpendicular to the axis of the track. The lever 7 is bent and carries a movable jaw 8 at one end and a roller 9 at its other end. The roller 9 bears against the lower surface of a control bar 10 adapted to move longitudinally in a direction parallel to the rail 2. The upper surface of the control bar 10 is substantially flush with the running surface of the rail 2 in the inoperative position of the track brake while its lower surface is provided with a sloping part 11, as shown in Fig. 4, so that upon longitudinal movement of the control bar 10, the upper surface of the latter is raised relative to the running surface of the rail 2.

The lever 7 is equilibrated in a manner such that the roller 9 may normally engage the lower part of the control bar 10 and may move up and down the slope 11. The movable beam 15 carries the jaw 5 and pivots upon or about a stationary bearer 18.

Figure 4:
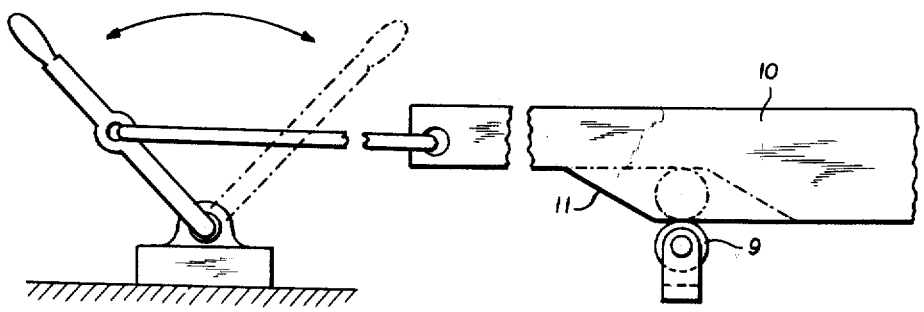
Fig. 4 is a side view of a section of the control bar.

Fig. 1 illustrates the brake when inoperative, the roller 9 assuming then with reference to the control bar 10 the position illustrated in dotted lines in Fig. 4, in which case the wheel of the railroad car may pass freely between the jaws 5 and 8 of the brake that are in this case sufficiently spaced for this purpose.

Fig. 2 illustrates the track brake in an intermediate position between the operative and inoperative position thereof.

Fig. 3 illustrates in contradistinction the track brake when operative, the roller 9 assuming with reference to the control bar 10 the position shown in Fig. 3, said position being obtained through a shifting of the bar 10 in parallelism with the rail 2, in order to make the roller 9 descend over the slope 11, to assume a position shown in full lines in Fig. 4. During this movement of the bar 10, the lever 7 turns upon the roller 16 which engages the stationary plate 17. The movable jaw 8 is constrained to move nearer the jaw 5, the spacing between the jaws being then less than the breadth of the tire of the wheel. At the same time the jaw 8 is slightly raised which increases the area of its clamping surface adapted to engage the tire.

During the pivotal movement of the lever 7 the spindle 14 rises relatively to the roller 16 and lifts simultaneously the corresponding end of the beam 15 which pivots upon the stationary bearer 18.

Due to this double pivoting movement of the lever 7 and of the beam 15, the jaws 5 and 8 rise to a height H above the upper level of the rails 1 and 2 into the position shown in Fig. 2, which height H is considerably greater than that of the height $h$ in the inoperative position, so that the clamping surface of the wheel tire is increased in operative position.

When a tire enters the brake, it urges slightly sideways the movable jaw 8 and causes the lever 7 to pivot upon the roller 16 whereby the roller 9 on the lever 7 has a tendency to raise the control bar 10. The upper surface of said bar in contact with the tire on the wheel urges the latter upwardly and consequently said wheel that is submitted to the weight of the car transmits to said bar 10 the thrust required for clamping the brake on the wheel.

While I have disclosed several embodiments of the present invention, it is to be understood that these embodiments are given by example only and not in a

I claim:

1. Apparatus for braking the movement of a vehicle having a pair of spaced wheels located on spaced track portions, each of the latter being supported by a frame, said apparatus comprising a stationary support, a two armed lever pivotally mounted intermediate the ends thereof on said stationary support for movement vertically about an axis parallel to said track portions, a first movable braking member mounted on one end of said lever on one side of one of said track portions exterior to the latter, so as to be located on one side of the one of said wheels on said one of said track portions, and means associated with the opposite end of said lever supporting the weight of a vehicle transmitted by the other of said wheels located on the other of said track portions, a beam disposed crosswise between said track portions and pivotally mounted intermediate the ends thereof on said two-armed lever for movement vertically about an axis parallel to said track portions and located at a point beyond said stationary support from said opposite end of said two-armed lever, a second movable braking member mounted on one end of said beam on the other side of said one of said track portions interior to the latter, so as to be located on the other side of the one of said wheels on said one of said track portions, the other end of said beam pivotally mounted on said frame corresponding to the other of said track portions, said first movable braking member being urged toward said second movable braking member by said means associated with the opposite end of said lever in the operative position of said apparatus.

2. Apparatus for braking the movement of a vehicle having a pair of spaced wheels located on spaced track portions, each of the latter being supported by a frame, said apparatus comprising a stationary support, a two-armed lever pivotally mounted intermediate the ends thereof on said stationary support for movement vertically about an axis parallel to said track portions, a first movable braking member mounted on one end of said lever on one side of one of said track portions exterior to the latter, so as to be located on one side of the one of said wheels on said one of said track portions, and a roller mounted on the opposite end of said lever, and an elongated operating member mounted on the other of said supports for movement in a direction substantially parallel to the track thereon and having an inclined surface portion directed towards said roller for contacting the same upon shifting of said operating member in said direction so as to tilt said lever about the pivotal axis thereof, so that said elongated operating member supports the weight of a vehicle transmitted by the other of said wheels located on the other of said track portions, being disposed crosswise between track portions and pivotally mounted intermediate the ends thereof on said two-armed lever for movement vertically about the axis parallel to said track portions and located at a point beyond said stationary support from said opposite end of said two-armed lever, a second movable braking member mounted on one end of said beam on the other side of said one of said track portions interior to the latter, so as to be located on the other side of the one of said wheels on said one of said track portions, the other end of said beam pivotally mounted on said frame corresponding to the other of said track portions, said first movable braking member being urged towards said second movable braking member by means of said elongated operating member in the operative position of said apparatus.

References Cited in the file of this patent

UNITED STATES PATENTS

| 1,787,818 | Frolich | Jan. 6, 1931 |
| 2,724,459 | Pons | Nov. 22, 1955 |

FOREIGN PATENTS

| 1,000,775 | France | Oct. 17, 1951 |
| 579,403 | Germany | June 27, 1933 |
| 579,494 | Germany | June 27, 1933 |